(12) United States Patent
Guillard et al.

(10) Patent No.: US 10,504,054 B2
(45) Date of Patent: Dec. 10, 2019

(54) TRAVEL INVENTORY DEMAND SIMULATION

(71) Applicant: Amadeus S.A.S., Biot (FR)

(72) Inventors: Bastien Guillard, Antibes (FR); Nicolas Carrez, Grasse (FR); Pierre-Yves Rault, Antibes (FR)

(73) Assignee: AMADEUS S.A.S., Biot (FR)

( * ) Notice: Subject to any disclaimer, the term of this patent is extended or adjusted under 35 U.S.C. 154(b) by 798 days.

(21) Appl. No.: 14/598,851

(22) Filed: Jan. 16, 2015

(65) Prior Publication Data
US 2016/0210583 A1   Jul. 21, 2016

(51) Int. Cl.
*G06Q 10/08* (2012.01)
*G06Q 10/02* (2012.01)

(52) U.S. Cl.
CPC .......... *G06Q 10/087* (2013.01); *G06Q 10/02* (2013.01)

(58) Field of Classification Search
CPC .... G06Q 10/087; G06Q 10/04; G06Q 10/067; G06Q 10/02
See application file for complete search history.

(56) References Cited

U.S. PATENT DOCUMENTS

| | | | |
|---|---|---|---|
| 7,328,166 B1 | 2/2008 | Geoghegan et al. | |
| 7,392,228 B2 | 6/2008 | Ternoey et al. | |
| 2008/0312977 A1* | 12/2008 | DeMarcken | G06Q 10/02 705/5 |
| 2009/0292566 A1* | 11/2009 | Bossert | G06Q 10/02 705/5 |
| 2010/0250291 A1* | 9/2010 | Walker | G06Q 10/02 705/5 |
| 2011/0022428 A1* | 1/2011 | Parker | G06Q 10/02 705/6 |
| 2012/0271679 A1* | 10/2012 | Schroder | G06Q 10/02 705/7.31 |

(Continued)

FOREIGN PATENT DOCUMENTS

EP   2079044   7/2009

OTHER PUBLICATIONS

Frank, M., Friedemann, M., & Schröder, A. (2008). Principles for simulations in revenue management. Journal of Revenue and Pricing Management, 7(1), 7-16. doi:http://dx.doi.org/10.1057/palgrave.rpm.5160107 (Year: 2008).*

(Continued)

*Primary Examiner* — Michael P Harrington
(74) *Attorney, Agent, or Firm* — Thompson Hine LLP

(57) ABSTRACT

Systems, methods, and computer program products for analyzing travel object management by a database system. Simulated demand requests for a simulation period are received. Availability requests for travel objects managed by the database system are generated based at least in part on the simulated demand requests. An availability response is received from the database system for each availability request that indicates an availability for each travel object. A booking decision is simulated for each travel object for the simulation period based at least in part on the simulated demand requests and the availability for each travel object. Simulation data for the simulation period is stored based at least in part on the availability requests, the availability response for each availability request, and the simulated booking decision for each travel object.

22 Claims, 13 Drawing Sheets

(56) References Cited

U.S. PATENT DOCUMENTS

2013/0290150 A1  10/2013  Weerahandi et al.

OTHER PUBLICATIONS

Smith, B. C., Gunther, D. P., Rao, B. V., & Ratliff, R. M. (2001). E-commerce and operations research in airline planning, marketing, and distribution. Interfaces, 31(2), 37-55. Retrieved from https://search.proquest.com/docview/217118786?accountid=14753 (Year: 2001).*

Pölt, S. (2004). How to aggregate origin and destination availability. Journal of Revenue and Pricing Management, 3(2), 191-199. Retrieved from https://search.proquest.com/docview/214494068?accountid=14753 (Year: 2004).*

European Search Report and European Search Opinion; European Patent Application No. 15290011.4; (dated May 11, 2015).

European Search Report and European Search Opinion; European Patent Application No. 15290010.6; (dated May 12, 2015).

* cited by examiner

| AggOnD | Number of demand | Cabin | POS | Bkg class | |
|---|---|---|---|---|---|
| NCE-SIN | 3 | Y | NCE | A | 302 |
| | | Y | SIN | A | 304 |
| | | Y | NCE | B | 306 |
| FRA-SIN | 2 | Y | FRA | A | 308 |
| | | J | SIN | D | 310 |

_570_

| CABIN | RANK |
|---|---|
| FIRST | 1 |
| BUSINESS | 2 |
| ECONOMY | 3 |

⇐ PREFERRED (pointing to FIRST row)

| CABIN | RANK |
|---|---|
| FIRST | 3 |
| BUSINESS | 2 |
| ECONOMY | 1 |

⇐ PREFERRED (pointing to ECONOMY row)

| CABIN | RANK |
|---|---|
| FIRST | 2 |
| BUSINESS | 1 |
| ECONOMY | 3 |

⇐ PREFERRED (pointing to BUSINESS row)

FIG. 10C

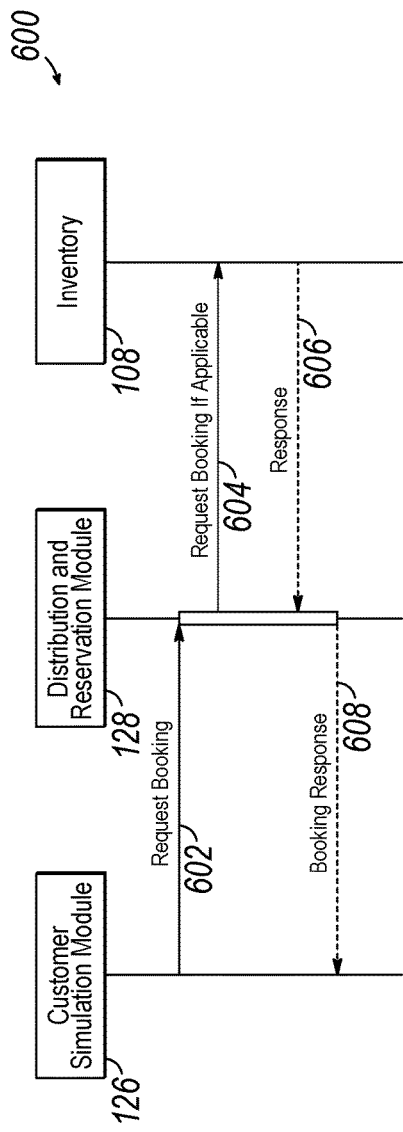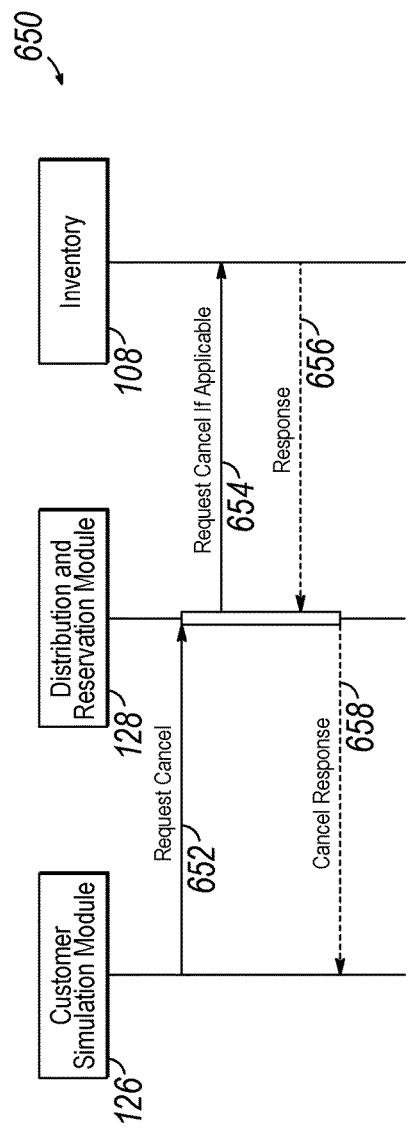
FIG. 11
FIG. 12

750

| Cabin/Class | | Inventory counters 762 | | DCS counters 752 | | | |
|---|---|---|---|---|---|---|---|
| Cabin | Class | Capacity 764 | Bookings 766 | Boarded | Denied | Upgrade-In | Upgrade-Out |
| F | F | 5 | 6 | 5 | 1 | 0 | 0 |
| J | J | 10 | 2 | 2 | 0 | 0 | 0 |
|   | D |   | 3 | 3 | 0 | 0 | 0 |
|   | C |   | 3 | 5 | 0 | 2 | 0 |
| Y | Y | 20 | 5 | 3 | 0 | 0 | 2 |
|   | H |   | 8 | 8 | 0 | 0 | 0 |
|   | K |   | 10 | 9 | 1 | 0 | 0 |

| Cabin/Class | | Inventory counters 812 | | DCS counters 802 | | | |
|---|---|---|---|---|---|---|---|
| Cabin | Class | Capacity 814 | Bookings 816 | Boarded | Denied | Upgrade-In | Upgrade-Out |
| F | F | 5 | 6 | 5 | 1 | 0 | 0 |
| J | J | 10 | 8 | 10 | 0 | 2 | 0 |
|   | D |   |   |   |   |   |   |
|   | C |   |   |   |   |   |   |
| Y | Y | 20 | 23 | 20 | 1 | 0 | 2 |
|   | H |   |   |   |   |   |   |
|   | K |   |   |   |   |   |   |

TRAVEL INVENTORY DEMAND SIMULATION

TECHNICAL FIELD

The invention is generally related to computers and data processing, and in particular to systems, methods, and computer program products for management of a database system, benchmarking of a database system, and evaluation of a database system.

BACKGROUND

Computer technology is increasingly used in the travel industry to manage and support travel reservations, as well as data associated therewith. In particular, third party reservation agents, such as travel agents, and/or customers (e.g., travelers) often utilize computer based devices to interface with a travel reservation system, such as a Global Distribution System (GDS), to book travel arrangements and/or travel related services for the customer. When reserving travel related services using such reservation terminals in communication with such travel reservation systems, a travel agent and/or customer may initiate a reservation session between a client device and the travel reservation system to book one or more travel inventory items corresponding to the travel related services (e.g., flights, hotels, rail transportation, dining reservations, etc.) for the customer during the reservation session. During the reservation session, the reservation system may interface with inventory systems of one or more travel merchants to book one or more travel inventory items of the travel merchants. Moreover, in the electronic travel reservation technology area, the inventory systems and/or reservation systems may comprise one or more database systems. In general, a travel inventory item refers to a unit or item from a saleable inventory of a travel merchant. For example, a travel inventory item of an airline may refer to a place on a segment, i.e. a place on a flight between an origin and destination, but generally does not refer to a specific physical seat. Each inventory system is configured to manage travel inventory items for a travel merchant, where such management may include determining availability and pricing for such travel inventory items.

Consequently, a need exists in the art for improved systems, methods, and computer program products for database management, database benchmarking, and database evaluation.

SUMMARY

Embodiments of the invention generally comprise methods, systems, and computer program products for analyzing production travel inventory item management by an inventory system. Simulated demand requests for a predefined range of days for simulation are received at a data processing system. One or more first availability requests for one or more production travel inventory items managed by the inventory system are generated with at least one processor of the data processing system based at least in part on the simulated demand requests. A first availability response from the inventory system for each of the one or more first availability requests is received at the data processing system, where the first availability responses indicate an availability for each of the one or more production travel inventory items. A first booking decision for each of the one or more production travel inventory items is simulated at the data processing system for each day of the range of simulation days based at least in part on the simulated demand requests and the availability for each of the one or more production travel inventory items. First simulation data for the predefined range of days is stored at the data processing system, where the first simulation data is based at least in part on the first availability requests, the first availability response for each first availability request, and the first booking decision for each of the one or more production travel inventory items.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIGS. 10A-C are tables that illustrate an example ranking of cabins that may be used to create class paths consistent with some embodiments of the invention.

FIG. 11 is a sequence diagram illustrating a routine that may be performed by the data processing system and/or inventory system of FIG. 1 to process a booking request consistent with some embodiments of the invention.

FIG. 12 is a sequence diagram illustrating a routine that may be performed by the data processing system and/or inventory system of FIG. 1 to a process a cancellation request consistent with some embodiments of the invention.

FIGS. 14A-B are tables that illustrate an example departure control system counter computation that may be performed by the data processing system of FIG. 1.

DETAILED DESCRIPTION

Figure 1:
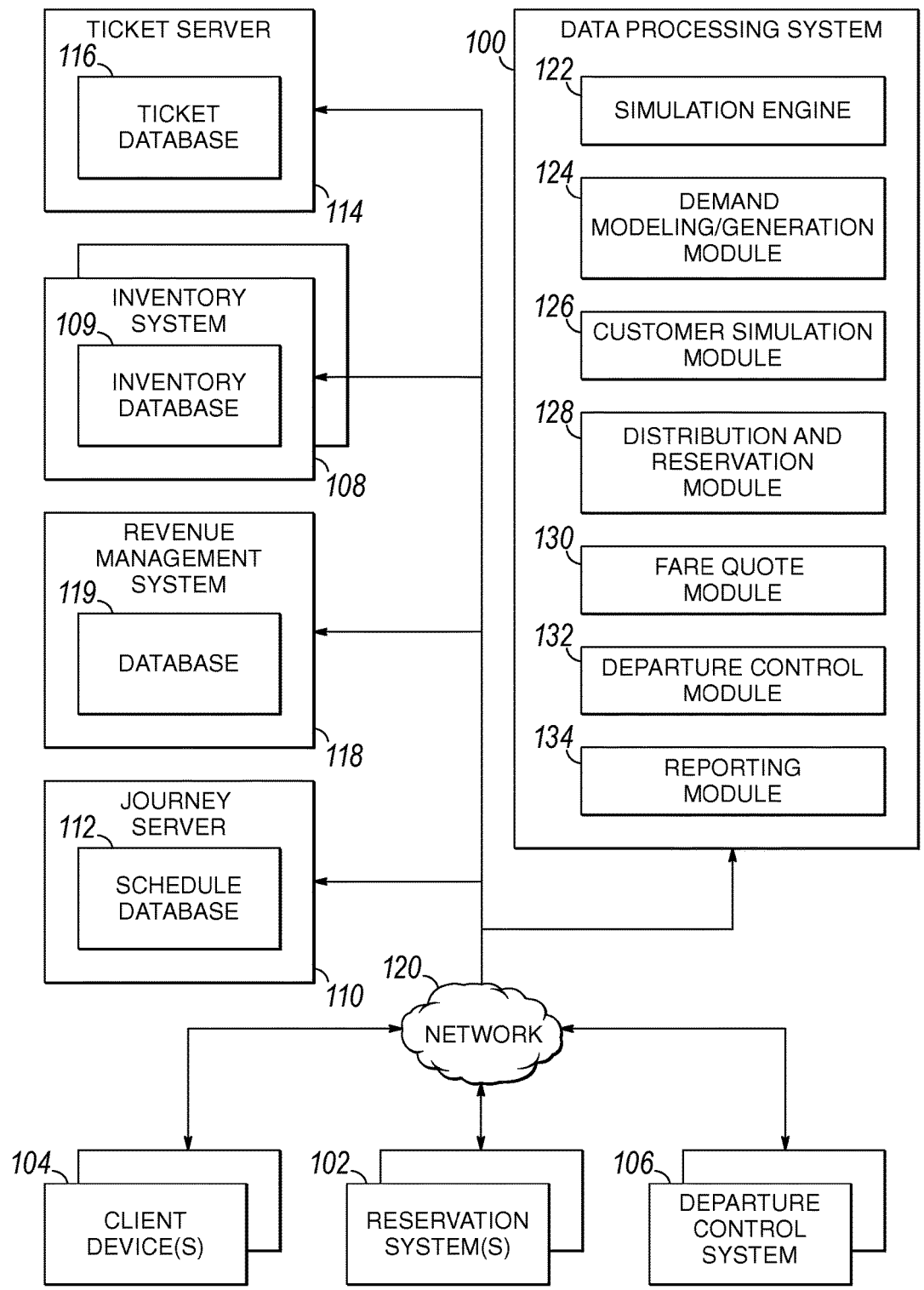
FIG. 1 is a block diagram of one or more reservation systems, one or more inventory systems, one or more client devices, and a data processing system consistent with embodiments of the invention.

Embodiments of the invention provide systems, methods, and computer program products for analyzing travel object management by a database system. Simulated demand requests for a simulation period are received. Availability requests for travel objects managed by the database system are generated based at least in part on the simulated demand requests. An availability response is received from the database system for each availability request that indicates an availability for each travel object. A booking decision is simulated for each travel object for the simulation period based at least in part on the simulated demand requests and the availability of each travel object. Simulation data for the simulation period is stored based at least in part on the availability requests, the availability response for each availability request, and the simulated booking decision for each travel object. In some embodiments of the invention, the database system is an inventory system, and a travel object is a production travel inventory item.

Embodiments of the invention analyze an inventory system that manages production travel inventory items. Generally, simulated demand requests may be received at a data processing system, and the simulated demand requests may be used to generate availability requests for production travel inventory items managed by the inventory system. The data processing system may receive availability responses from the inventory system for the availability requests, where an availability response for a particular availability request indicates an availability for each of one or more production travel inventory items associated with the particular availability request. As will be appreciated, the simulated demand requests may be utilized to evaluate management of production travel inventory items by an inventory system.

In particular, the data processing system may process the simulated demand requests to thereby simulate a booking decision and a reservation system interface with the inventory system to analyze management of the production inventory items by the inventory system. Consistent with some embodiments of the invention, simulated demand requests may be processed by the data processing system to determine production travel inventory item availability determined by the inventory system and/or revenue management rules implemented at the inventory system. As should be appreciated, the simulated demand requests are therefore used to determine availability and pricing response of an inventory system based on actual travel inventory items (i.e., actual saleable inventory) taking into account actual availability (i.e., based on actual bookings) and actual revenue management rules (i.e., bid prices, yield, etc.). The travel inventory items, the availability, bid prices/yield, and/or other such data related to offered travel inventory items may be referred to as production travel inventory items, production availability, production bid prices/yield, and/or collectively as production data.

As will be appreciated and described herein, a travel segment generally corresponds to travel between a departure point and an arrival point, where a travel inventory item represents a saleable unit for a travel service component between the departure point and the arrival point for the travel segment. Travel segments may be combined to form a journey having an origin and a destination (O&D) pair. For example, a first travel inventory item may correspond to a travel service component for a travel segment from city A to city B, and a second travel inventory item may correspond to a travel service component for a travel segment from city B to city C. The journey would have an origin of city A and a destination of city C, which may be referred to as an O&D pair of A-C. As will be appreciated, a travel solution is associated with a journey, where the travel solution comprises one or more travel inventory items that facilitate travel for the O&D pair.

Furthermore, a ticketed travel inventory item is an inventory item for which a booking has been finalized and a payment has been collected. Consistent with embodiments of the invention, a ticket record generally stores passenger information, travel segments, and/or a ticket price for one or more ticketed travel inventory items. In addition, a travel solution generally refers to one or more travel inventory items for travel services between an origin and a destination. Referring to the previous example, if an O&D pair for a simulated demand request is A-C, a travel solution for the simulated demand request may include the first travel inventory item and the second travel inventory item. As will be appreciated, travel solutions may be determined at the data processing system based at least in part on an availability received for one or more travel inventory items associated with the simulated demand request. Generally, a travel solution for a simulated demand request may be priced at the data processing system based at least in part on availability and/or revenue management rules of the inventory system communicated to the data processing system.

Turning now to the figures, and particularly to FIG. 1, this figure provides a block diagram illustrating the one or more devices and/or systems consistent with embodiments of the invention. As shown in FIG. 1, a data processing system 100 may be in communication with one or more systems generally associated with travel reservation and travel inventory management. In particular, a reservation system 102 that may be implemented as one or more servers, one or more client devices 104, one or more departure control systems 106, an inventory system 108 that may be implemented as one or more servers and includes an inventory database 109, a journey server 110 that includes a schedule database 112, a ticket server 114 that includes a ticket database 116, and/or a revenue management system 118 that includes a database 119 and is associated with the inventory system 108 may be in communication over a communication network 120, where the communication network 120 may comprise the Internet, a local area network (LAN), a wide area network (WAN), a cellular voice/data network, one or more high speed bus connections, and/or other such types of communication networks. As will be appreciated, the reservation system 102 may correspond to a global distribution system (GDS). As discussed, the ticket server 114 may comprise the ticket database 116. The inventory database 109 stores production travel inventory items and associated inventory counters. In general, the ticket database 116 stores ticket records for ticketed travel inventory items, including travel segments for a ticket, passenger information for the ticket, and a ticket price. The journey server 110 may comprise the schedule database 112, where the schedule database 112 stores schedule and travel service provider information for one or more travel segments. For example, the schedule database 112 may store a departure point, an arrival point, a departure time, and an arrival time for one or more travel segments. Furthermore, the schedule database 112 may also store scheduling rules that may limit the manner in which travel segments may be combined for a journey. The database 119 of the revenue management system 118 may store pricing rules, bid prices, and/or yields associated with the production travel inventory items of the inventory database 109 as well as historical production booking data.

Consistent with embodiments of the invention, the data processing system 100 includes one or more modules/engines that may be configured to perform operations generally associated with systems used in travel reservation booking and travel inventory management. In particular, the data processing system 100 includes a simulation engine 122, where the simulation engine 122 is configured to manage a simulation as will be described herein. The demand modeling/generation module 124 is configured to generate a demand model and a cancel model based at least in part on ticket records and generate simulated demand requests and simulated cancel requests based at least in part on the demand model and the cancel model.

The customer simulation module 126 is configured to simulate customer behavior. For each day of a simulation, the customer simulation module 126 simulates customer booking demand and cancel demand on reservation systems based at least in part on simulated demand requests and simulated cancel requests generated by the demand modeling/generation module 124. In particular, a booking/shopping flow for one or more travel solutions may be performed by the customer simulation module in communication with the distribution and reservation module 128. Based on booking/shopping responses from the distribution and reservation module 128, the customer simulation module 126 simulates booking decisions (i.e., selecting a travel solution for booking). The distribution and reservation module 128 is configured to simulate a reservation system such as a global distribution system. The distribution and reservation module 128 determines travel solutions for travel requests generated by the customer simulation module 126. The distribution and reservation module 128 may communicate with the inventory system 108 to determine and propose to the customer simulation module 126 available travel solutions with prices. Furthermore, the distribution and reservation module 128 interfaces with the customer simulation module 126 to perform bookings and cancellations. In addition, the distribution and reservation module 128 stores passenger booking records.

The fare quote module 130 is configured to determine and/or simulate available fares for travel inventory items with fare rules (e.g., advance purchase, Saturday night stay, minimum stay, cancellation fee, change fee, etc.). Therefore, the distribution and reservation module 128 may interface with the fare quote module 130 to determine pricing for available travel solutions based on availability and/or bid prices/yields received from the inventory system 108. The departure control module 132 is configured to simulate the functions of a departure control system such that no show passengers for a travel service and passengers that arrive without a booking/ticket may be simulated. In particular, the departure control module 132 computes, for each departed travel service, the resulting denied boarding passengers, which may be sent to the distribution and reservation module 128 and/or the inventory system 108. The reporting module 134 is configured to store data based on operations performed by the engines/modules 122-132. As will be appreciated, the reporting module may store simulation data for each day of a simulation period; in addition, the reporting module may store simulation data for a first simulation and a second simulation, such that a comparison between the two simulations may be performed. For example, a user may configure the revenue management system 118 and/or the inventory system 108 with a first set of configuration rules/settings for determining availability and bid prices/yield, and a simulation may be performed to generate first simulation data. The user may then configure the revenue management system 118 and/or the inventory system 108 with a second set of configuration rules/settings for determining availability and bid prices/yield, and a simulation may be performed to generate second simulation data. Therefore, the configuration of the inventory system 108 and/or the revenue management system 118 based on the first set of configuration rules and the second set of configuration rules may be compared.

Figure 2:
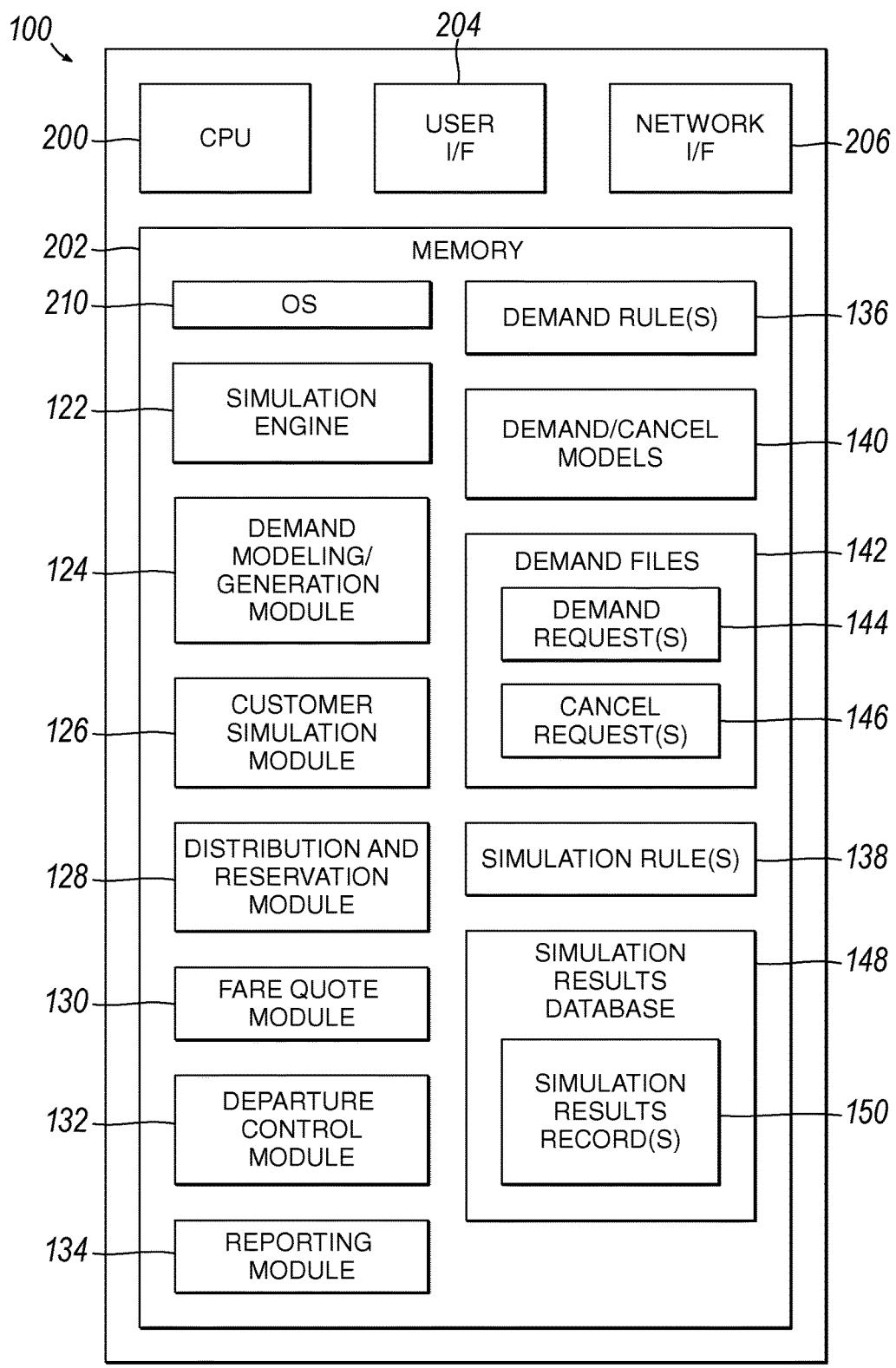
FIG. 2 is a block diagram of a data processing system of FIG. 1.

FIG. 2 provides a block diagram that illustrates the components of the data processing system 100. The data processing system 100 includes at least one processor (CPU) 200 including at least one hardware-based microprocessor and a memory 202 coupled to the at least one processor 200. The memory 202 may represent the random access memory (RAM) devices comprising the main storage of data processing system 100, as well as any supplemental levels of memory, e.g., cache memories, non-volatile or backup memories (e.g., programmable or flash memories), read-only memories, etc. In addition, memory 202 may be considered to include memory storage physically located elsewhere in the data processing system 100, e.g., any cache memory in a microprocessor, as well as any storage capacity used as a virtual memory, e.g., as stored on a mass storage device or on another computer coupled to the data processing system 100.

For interface with a user or operator, the data processing system 100 may include a user interface 204 incorporating one or more user input/output devices, e.g., a keyboard, a pointing device, a display, a printer, etc. Otherwise, data may be communicated to and from another computer or terminal (e.g., a client device 104, the inventory system 108, the ticket server 114, etc.) over a network interface 206 coupled to the communication network 120. The data processing system 100 also may be in communication with one or more mass storage devices, which may be, for example, internal hard disk storage devices, external hard disk storage devices, external databases, storage area network devices, etc.

The data processing system 100 typically operates under the control of an operating system 210 and executes or otherwise relies upon various computer software applications, components, programs, objects, modules, engines, data structures, etc., including for example, a simulation engine 122, a demand modeling/generation module 124, a customer simulation module 126, a distribution and reservation module 128, a fare quote module 130, a departure control module 132, and/or a reporting module 134. Furthermore, the memory 202 may store one or more configuration rules that may be used by the data processing system 100 in generating simulated demand requests and/or analyzing the management of travel inventory items by the inventory system 108 by performing one or more simulations. In particular, the memory may store demand rules 136 that may be used by the demand modeling/generation module 124 to generate a demand model, a cancel model, simulated demand requests, and/or simulated cancel requests. The memory may store simulation rules 138 that may be used by the simulation engine 122 during simulation of shopping/booking of travel inventory items managed by the travel inventory system 108. In addition, the memory 202 may store demand and/or cancel models 140 as well as demand files 142 comprising simulated demand requests 144 and/or simulated cancel requests 146 generated by the demand/modeling generation module 124. Moreover, the memory 202 may store a simulation results database 148 that stores simulation data in one or more simulation results records 150 for one or more simulations performed by the data processing system 100.

Figures 3, 4:
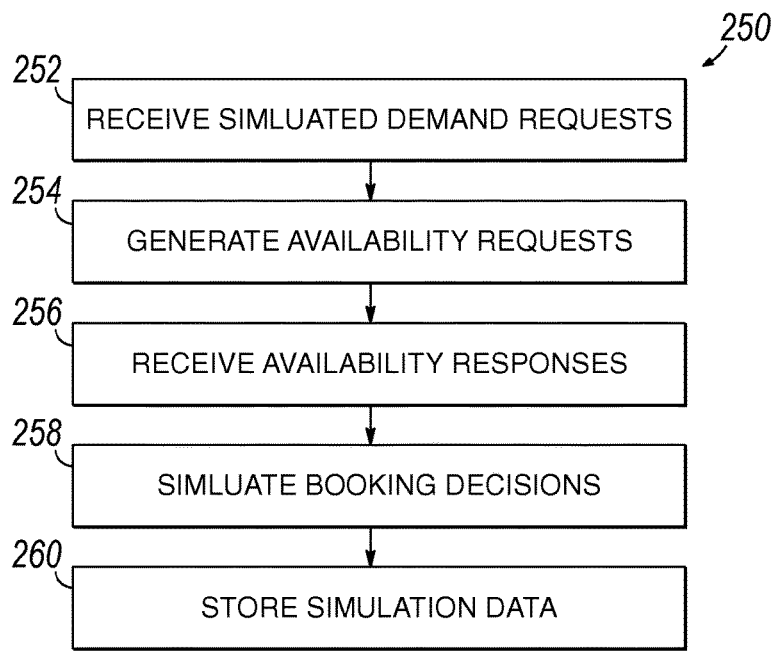
FIG. 3 is a flowchart illustrating a sequence of operations that may be performed by the data processing system of FIG. 1 to analyze production travel inventory management by an inventory system consistent with embodiments of the invention.
FIG. 4 is a table that provides example booking demand lines that may be processed by the data processing system of FIG. 1.

Turning now to FIG. 3, this figure provides a flowchart 250 that illustrates a sequence of operations that may be performed by a data processing system 100 consistent with embodiments of the invention to analyze production travel inventory management by an inventory system. The data processing system 100 may receive simulated demand requests (block 252). In general, each simulated demand request corresponds to a respective day for a range of simulation days (i.e., simulation period). Each simulated demand request includes one or more booking demand lines for the respective day. In general, each booking demand line corresponds to a single booking request for a simulated customer to the travel merchant. Each demand line generally includes all attributes associated with the booking request, including, for example, an O&D, a POS, a willingness-to-pay, etc. For example, if a simulated demand request includes ten booking demand lines, embodiments of the invention may simulate a booking/shopping flow for each of the ten booking demand lines with the inventory system for the respective day. Similarly, a simulated cancel request comprises one or more cancellation demand lines for a respective day of a range of simulation days. Each cancellation demand line generally includes all attributes associated with a cancellation request. A cancellation demand line may identify a corresponding booking demand line for which cancellation thereof is to be performed. Collectively, for a particular day, a simulated demand request and a simulated cancel request may be referred to as a demand file.

For each day of the range of simulation days, the data processing system 100 generates availability requests for one or more production travel inventory items based on the simulated demand requests (block 254). As will be appreciated, a simulated demand request includes demand lines for a number of booking/shopping flows to initiate with the inventory system for a respective simulation day. Furthermore, as discussed, the data processing system 100 may identify one or more production travel inventory items for each demand line, and the data processing system generates an availability request for each identified one or more production travel inventory items.

The availability requests are communicated to the inventory system, where each availability request identifies one or more production travel inventory items for which availability information is requested. The data processing system receives an availability response for each availability request communicated to the inventory system (block 256). For a respective availability request identifying one or more production travel inventory items, the corresponding availability response indicates an availability for each of the one or more production travel inventory items. Based on the received availability responses, the data processing system 100 may simulate booking decisions for the one or more production travel inventory items (block 258). Generally, the data processing system 100 (and particularly the customer simulation module) may simulate a customer decision making flow for the one or more production travel inventory items based at least in part on the availability of the one or more production travel inventory items, an associated booking demand line, pricing of travel solutions incorporating the one or more production travel inventory items, and/or other such information. The data processing system 100 stores simulation data for the performed simulation based on the simulated demand requests, the generated availability requests, the availability responses, and/or the simulated booking decisions (block 260). As will be appreciated, in some embodiments, the data processing system may compare simulation data for a first simulation to simulation data for a second simulation to analyze different management configurations of the inventory system and/or a revenue management system connected thereto.

FIG. 4 provides a table 300 that provides a simplified example of booking demand lines 302-310 that may be processed by the data processing system 100. In this example, for an aggregated O&D pair of NCE-SIN, the table 300 includes: a booking demand line 302 with a cabin of 'Y', a point of sale of 'WE', and a booking class of 'A'; a booking demand line 304 with a cabin of 'Y', a point of sale of SIN, and a booking class of 'A'; and a booking demand line 306 with a cabin of 'Y', a point of sale of NCE, and a booking class of 'B'. In addition, for an aggregated O&D pair of 'FRA-SIN', the table 300 includes: a booking demand line 308 with a cabin of 'Y', a point of sale of 'FRA', and a booking class of 'A'; and a booking demand line 310 with a cabin of 'J', a point of sale of 'SIN', and a booking class of 'D'. Generally, demand information that may be included in a booking demand line may include an origin and destination pair (or an aggregated O&D pair, a cabin, a point of sale, a willingness-to-pay, a booking class, a reservation date, a departure date, a trip type, a frequent flyer tier, and/or other such demand information/attributes that may be included in the booking demand line. The demand information of a booking demand line may be used to generate an availability request and/or simulate a booking flow for making a simulated booking decision. As will be appreciated, simulated cancellation requests may comprise similar information. Each simulated cancellation request may comprise cancel demand lines, where each cancel demand line may identify a corresponding booking demand line. When the data processing system processes a cancel demand line, the data processing system 100 simulates cancellation of a simulated booking generated by the corresponding booking demand line.

For initializing a simulation, the data processing system 100 may generate one or more graphical user interface displays such that a user may provide input information for a simulation. In general, the data processing system 100 generates the one or more graphical user interface displays and processes input data received therefrom with the simulation engine 122. Moreover, the simulation engine 122 may provide a user with simulation data in one or more visualizations generated for display to the user. For example, in some embodiments, the data processing system 100 executing the simulation engine 122 may generate one or more visualizations based on stored simulation data for user review. For input data for a particular simulation, a user may input: a simulation name that may be used to store simulation data generated during the particular simulation; a number of iterations (e.g., a number of times a simulation should be performed); a simulation scenario (e.g., a number of times in a simulated month an inventory system may interact with a revenue management system of the travel merchant); and/or a simulation details file that includes information that define the simulation. A simulation details file may comprise: a travel merchant identifier; a simulation start date and end date (that define a range of simulation days); and identifier for simulated demand requests to be used in the simulation; a travel merchant profile (configuration information that details booking classes and class structure, average taxes, demand generation unconstraining factors, and/or other such information); travel merchant parameters (configuration variables for the inventory system and revenue management system of the travel merchant); inventory system information (e.g., version, database, and rules); revenue management system information (e.g., version, database, and rules).

Prior to initialization of a particular simulation, the simulation engine 122 may store simulation settings for the particular simulation in the simulation rules 138, where the simulation rules generally comprise a list of tasks to execute for the particular simulation and settings for each task. As will be appreciated, the simulation engine 122 may generate the list of tasks based at least in part on user input provided via one or more graphical user interface displays generated by the data processing system 100. The tasks for the particular simulation generally define the processes that the simulation engine 122 will execute during the particular simulation. During the particular simulation, the data processing system 100 stores simulation data in the simulation results database 148 as the tasks of the particular simulation are performed. Each task generally comprises: a simulation key that identifies a particular simulation to which the task is associated, where the simulation key may be generated based at least in part on a simulation name of the particular simulation, a simulation time stamp, and/or a simulation iteration number; a simulation day that identifies a particular simulation day of the range of simulation days to which the task is associated; a task number/identifier that may identifies the task; a task name; a task command line that includes a shell command line of the task; a retry counter that indicates if the task failed, how many times the task should be retried; a retry command line that may indicate a shell command line to execute between each retry; optional information that identifies if the simulation must stop if the task fails; a task status that indicates whether the task has been executed (i.e., performed), the task is pending execution, or if the task failed (i.e., in error); and/or a task duration that indicates a time duration for execution of the task.

The simulation engine 122 provides an interface for a user and coordinates the performance of the one or more tasks defined for the simulation. In particular, the simulation engine 122 may provide an interface through which a user may control execution of the tasks. For example, the simulation engine 122 may hold a simulation that has been run and re-run the simulation from a point at which it was held. As another example, the simulation engine 122 may automatically stop a simulation responsive to detecting an error, and once the error is addressed, the simulation engine 122 may resume the simulation from a point at which the simulation was stopped. Furthermore, the simulation engine 122 may automatically execute a task one or more times if errors occur or execution of the task fails until execution of the task is successful. In addition, the simulation engine 122 may be configured to monitor execution of a simulation. In such embodiments, the simulation engine 122 may generate one or more graphical user interface displays that may list all existing simulations, list all simulations in function of a status (e.g., pending, executed, in error, etc.), and/or provide details for a simulation. For example, the simulation engine 122 may indicate: a progress of a simulation (e.g., number of tasks completed, percentage of tasks completed relative to total list of tasks, etc.); a currently executing task; an elapsed time since the simulation was initialized; and/or an estimated time remaining.

Once the simulation is defined (i.e., the tasks are generated), the simulation engine 122 may orchestrates and/or controls the execution of the tasks of the simulation for a simulation period (e.g., the range of simulation days). For each simulation day of the simulation period, the simulation engine 122 triggers processes in different modules of the data processing system 100 to perform the tasks of the simulation, where the simulation engine 122 generally provides input to each module and receives the output from each module. In particular, the simulation engine 122 triggers the customer simulation module 126, and the customer simulation module 126 simulates booking/cancellation demand based on simulated booking requests and cancellation demand based on simulated cancellation requests. Generally, the customer simulation module 126 may simulate a shopping flow and make a booking decision for one or more travel solutions comprising one or more of the production travel inventory items of managed by the inventory system. The simulation engine 122 may trigger the departure control module 132 which may simulate a departure control system. Consistent with embodiments of the invention, the departure control module 132 simulates customers not showing for booked travel solutions, potential customers arriving without a booking, etc. The departure control module 132 may generate simulated denied booking results therefrom. Furthermore, the reporting module 134 may monitor the execution of tasks and may generate simulation data during execution of a simulation based on the execution of the tasks, data generated thereby, and/or data received from the inventory system. In some embodiments, the data processing system 100 evaluate configurations of the inventory system and/or revenue management system by analyzing simulation data collected during simulations performed with different configurations of the inventory system and/or revenue management system.

Upon initialization of a simulation, inputs for the simulation generally comprise: simulated demand requests; simulated cancel requests; simulation settings, including the simulation period, a travel merchant identifier, an inventory system and associated business rules, a revenue management system and associated business rules; and/or a simulation initial state, which indicates an initial state of the production travel inventory items of the inventory system, an initial state of schedules for travel services offered by the travel merchant, and/or an initial state of the revenue management system. Outputs of a simulation generally comprise: a simulation final state that indicates a final state of the production travel inventory items of the inventory system, a final state of schedules for travel services offered by the travel merchant, and/or a final state of the revenue management system; and/or a simulation intermediate state that indicates one or more states of the production travel inventory items of the inventory system, one or more states of the schedules for travel services, and/or one or more states of the revenue management system at times and/or simulation dates during the simulation. The reporting module 134 may log the state information in the simulation results database 148.

Figure 5:
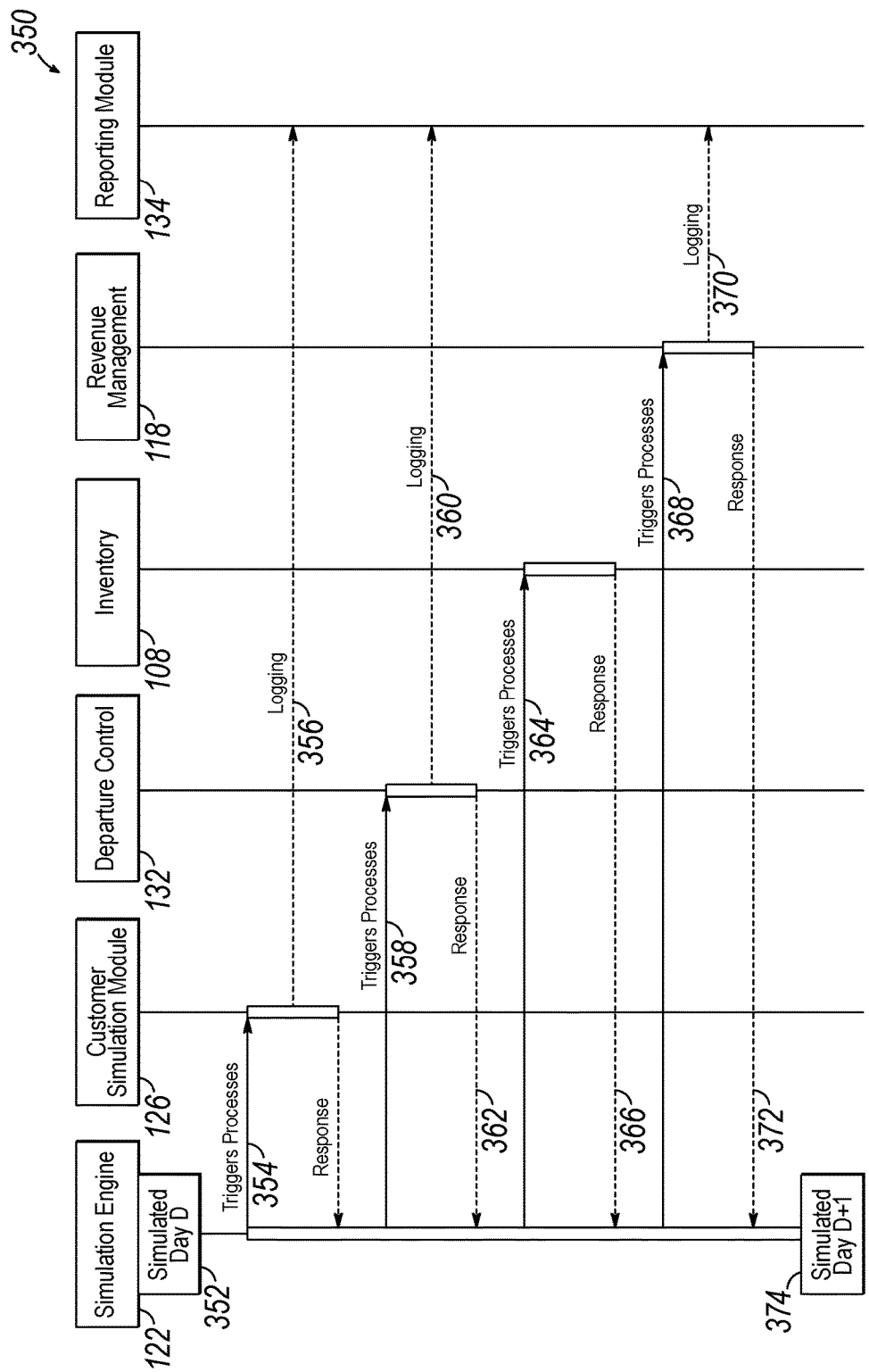
FIG. 5 is a sequence diagram illustrating a routine that may be performed by the data processing system, the inventory system, and/or the revenue management system of FIG. 1 to simulate a particular simulation day of a range of simulation days consistent with some embodiments of the invention.

FIG. 5 provides an example routine 350 in the form of a sequence diagram that may be performed by the data processing system 100 in communication with the inventory system 108 and/or the revenue management system 118 during a simulation. As shown, the simulation engine 122 may simulate a particular simulation day (labeled 'Simulation Day D') of the range of simulation days based on a simulated demand requests and/or simulated cancellation request for the particular simulation day (block 352). The simulation engine 122 triggers one or more processes of the customer simulation module 126 (block 354). In response to performing the one or more triggered processes, simulation data based on the one or more triggered processes is sent to the reporting module 134 (block 356), and the customer simulation module 126 returns processed data in a response to the simulation engine 122.

Based on the response from the customer simulation module 126, the simulation engine 122 triggers one or more processes at the departure control module 132 (block 358). Simulation data based on the one or more triggered processes of the departure control module 132 is sent to the reporting module 134 for logging in the simulation results database 148 (block 360). The departure control module 132 sends processed data to the simulation engine 122 in a response (block 362). Based on the data from the departure control system 132, the simulation engine 122 triggers one or more processes at the inventory system 108 (block 364). Generally, the one or more processes may comprise determining an availability for one or more production travel inventory items managed by the inventory system 108. The inventory system 108 returns a response (i.e., an availability response) to the simulation engine 122 (block 366). Based on the response from the inventory system 108, the simulation engine 122 triggers one or more processes at the revenue management system 118 (block 368). The revenue management system 118 sends simulation data to the reporting module 134 for logging in the simulation results database 148 (block 370), and the revenue management system 118 communicates a response to the simulation engine 122 (block 372). Generally, the response from the revenue management system may include pricing information that may be used by the simulation engine 122 to simulate a booking decision. As shown, after simulating the particular simulation day 352, the data processing system may begin simulation of the next simulation day (labeled 'New Simulated Day D+1') of the range of simulation days (block 374).

Consistent with embodiments of the invention, the customer simulation module 126 is configured to simulate actions and/or decisions that a customer generally makes in a shopping, booking, and/or cancellation flow. The customer simulation module 126 processes simulated demand requests and simulated cancel requests associated with each day of a range of simulation days. Therefore, the customer simulation module 126 injects demand and cancellation demand into the simulation by analyzing the simulated demand requests and simulated cancel requests and interfacing with the distribution and reservation module 128 based at least in part on the simulated demand requests and the simulated cancel requests. Hence, inputs to the customer simulation module 126 generally comprise simulated demand requests and simulated cancel requests, and the customer simulation module 126 generates booking and cancellation decisions, where the generated booking and cancellation decisions may be logged by the reporting module 134.

Figure 6:
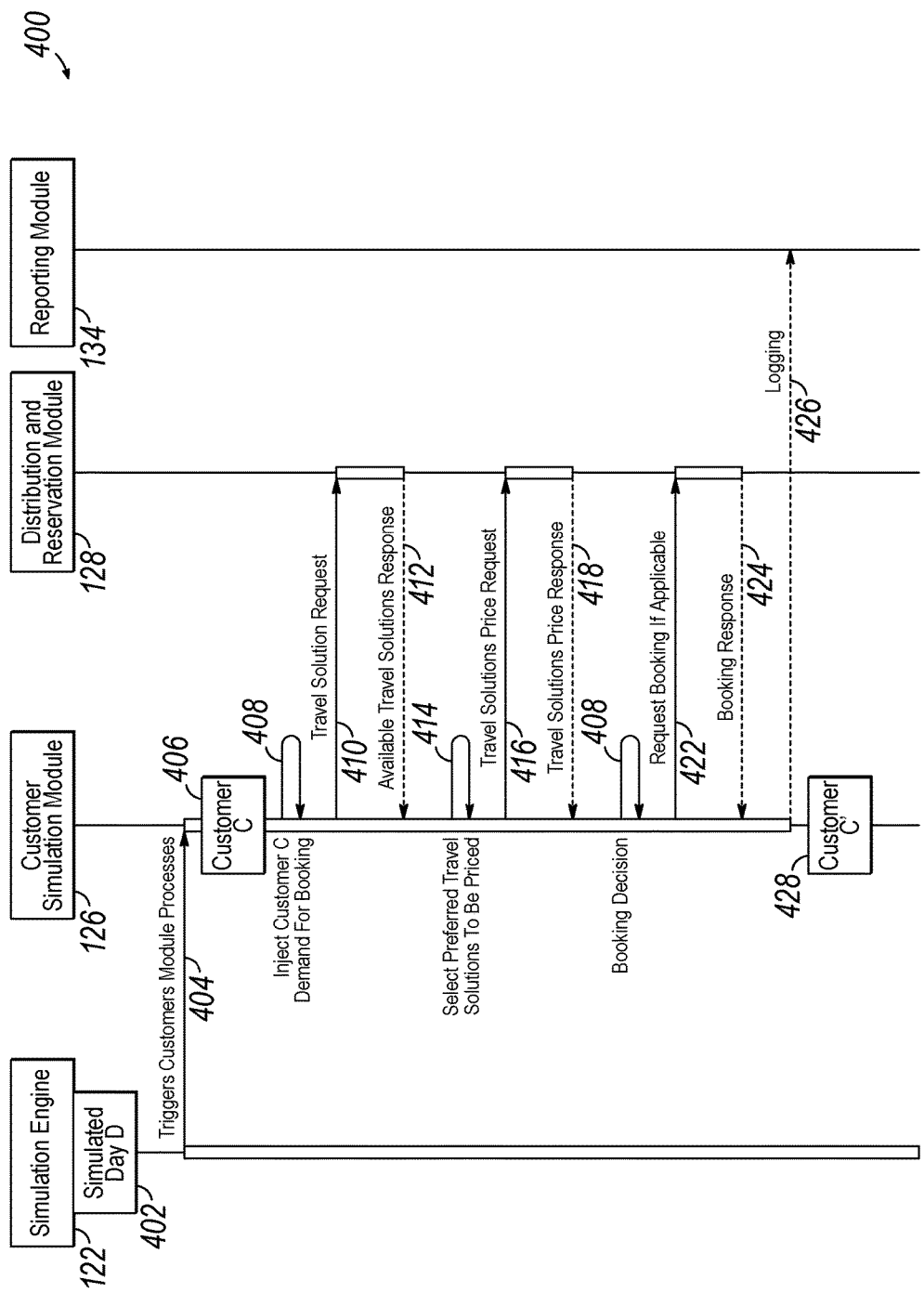
FIG. 6 is a sequence diagram illustrating a routine that may be performed by the data processing system of FIG. 1 to process a booking demand line during simulation consistent with some embodiments of the invention.

FIG. 6 provides an example routine 400 in the form of a sequence diagram that may be performed by the data processing system 100 to transform each booking demand line of a simulated demand request into a booking decision and/or shopping flow consistent with some embodiments of the invention. As shown, for a first simulation day (labeled 'Simulated Day D') 402, the simulation engine 122 triggers the customer simulation module 126 (block 404) for a first booking demand line (labeled 'Customer C') 406 of a simulated demand request for the first simulation day 402 (block 404). The customer simulation module 126 injects a booking demand associated with the booking demand line of Customer C 406 into the booking flow (block 408). The customer simulation module 126 generates a travel solution request based at least in part on information included in the booking demand line, and the travel solution request is communicated to the distribution and reservation module 128 (block 410). The travel solution request generally includes an origin, a destination, and/or a point of sale. The distribution and reservation module 128 determines available travel solutions for the travel solution request based at least in part on an origin and destination pair indicated in the travel solution request and availability for one or more production travel inventory items maintained by the inventory system 108, and the distribution and reservation module 128 communicates the determined available travel solutions to the customer simulation module (block 412). As will be appreciated, in some embodiments, the distribution and reservation module 128 may respond that available travel solutions do not exist for the travel solution request. In these embodiments, such absence of available travel solutions may be logged by the reporting module 134.

The customer simulation module 126 selects one or more available travel solutions for pricing based at least in part on demand information included in the demand line for Customer C (block 414). Generally, each available travel solution may include different cabins, different travel times, and/or different numbers of connections. Hence, the customer simulation module 126 may be configured to select one or more available travel solutions to price based at least in part on a preferred cabin, a travel time, and/or a number of connections associated with each available travel solution. In particular, with regard to cabin, the customer simulation module 126 may select available travel solutions for pricing by selecting, from among the available travel solutions, one or more particular travel solutions which propose a longest distance traveled in a preferred cabin relative to a travel distance of the journey. With regard to travel time, the customer simulation module 126 may select available travel solutions for pricing by selecting, from among the available travel solutions, one or more particular travel solutions associated with a shortest travel time for the associated journey. With regard to number of connections, the customer simulation module 126 may select available travel solutions for pricing by selecting, from among the available travel solutions, one or more particular travel solutions associated with a relatively lower number of connections.

Consistent with some embodiments of the invention, the customer simulation module 126 may select a number ('N') of available travel solutions for pricing based on a scoring determined for each available travel solution. In these embodiments, the customer simulation module 126 may determine, for each available travel solution, a cabin ratio (cr), a time ratio (tr) and a connection ratio (sr) according to the following equations:

$$\text{Cabin ratio: } cr = \frac{distance_{preferred\ cabin}}{distance_{total}};$$

Time ratio: $tr = \frac{1}{time}$; and

Connecion Ratio: $sr = \frac{1}{1 + NumberConnections}$.

A score for each available travel solution may be determined according to the following equation: score=$cr^2 \ast tr \ast sr$. The available travel solutions may be ranked, based at least in part on the score, and the customer simulation module 126 may select one or more of the available travel solutions for pricing based at least in part on the ranking thereof. The customer simulation module communicates a travel solution price request to the distribution and reservation module 128 that indicates the selected travel solutions (block 416).

The distribution and reservation module 128 prices the one or more selected travel solutions based at least in part on pricing information received from the fare quote module 130 for one or more production travel inventory items associated with the selected travel solutions, and the distribution and reservation module 128 communicates a pricing response that indicates a price for each of selected travel solutions (block 418). Generally, the pricing response comprises each selected available travel solution, an associated price, a revenue, and/or an associated class-path. The customer simulation module 126 simulates a booking decision based at least in part on willingness-to-pay information included in the booking demand line for Customer C (block 420) and the price for each selected available travel solution. Generally, a booking decision comprises: selecting a particular available travel solution for booking based at least in part on a price associated with the particular available travel solution; or determining to not book a travel solution based at least in part on willingness-to-pay information of the demand line and a price of each of the one or more available travel solutions. Consistent with some embodiments of the invention, the customer simulation module selects a lowest priced travel solution. If more than one of the priced travel solutions has the same lowest price, the customer simulation module may select a highest scored priced travel solution for booking.

Generally, the customer simulation module 126 determines to book a priced travel solution if the price is lower than a willingness-to-pay indicated in the booking demand line. If the customer simulation module 126 selects an available travel solution for booking, the customer simulation module 126 communicates a booking request to the distribution and reservation module 128 (block 422) that indicates the selected travel solution. The distribution and reservation module 128 generates a booking response for the booking request based at least in part on pricing information received from the revenue management system and an availability for each production travel inventory item associated with the indicated travel solution of the booking request, and the distribution and reservation module 128 communicates the booking response to the customer simulation module 126 (block 424). The customer simulation module 126 communicates simulation data based on the booking decision, booking response, and/or booking demand line to the reporting module 134 for logging in the simulation results database 148 (block 426). If a priced travel solution was not selected for booking due to a price higher than willingness-to-pay, the simulation data may indicate that pricing was too high for a booking to be made. After processing the first demand line (blocks 408-426), the customer simulation module 126 processes a second demand line (labeled 'Customer C") 428 for the first simulation day D 402.

Figure 7:
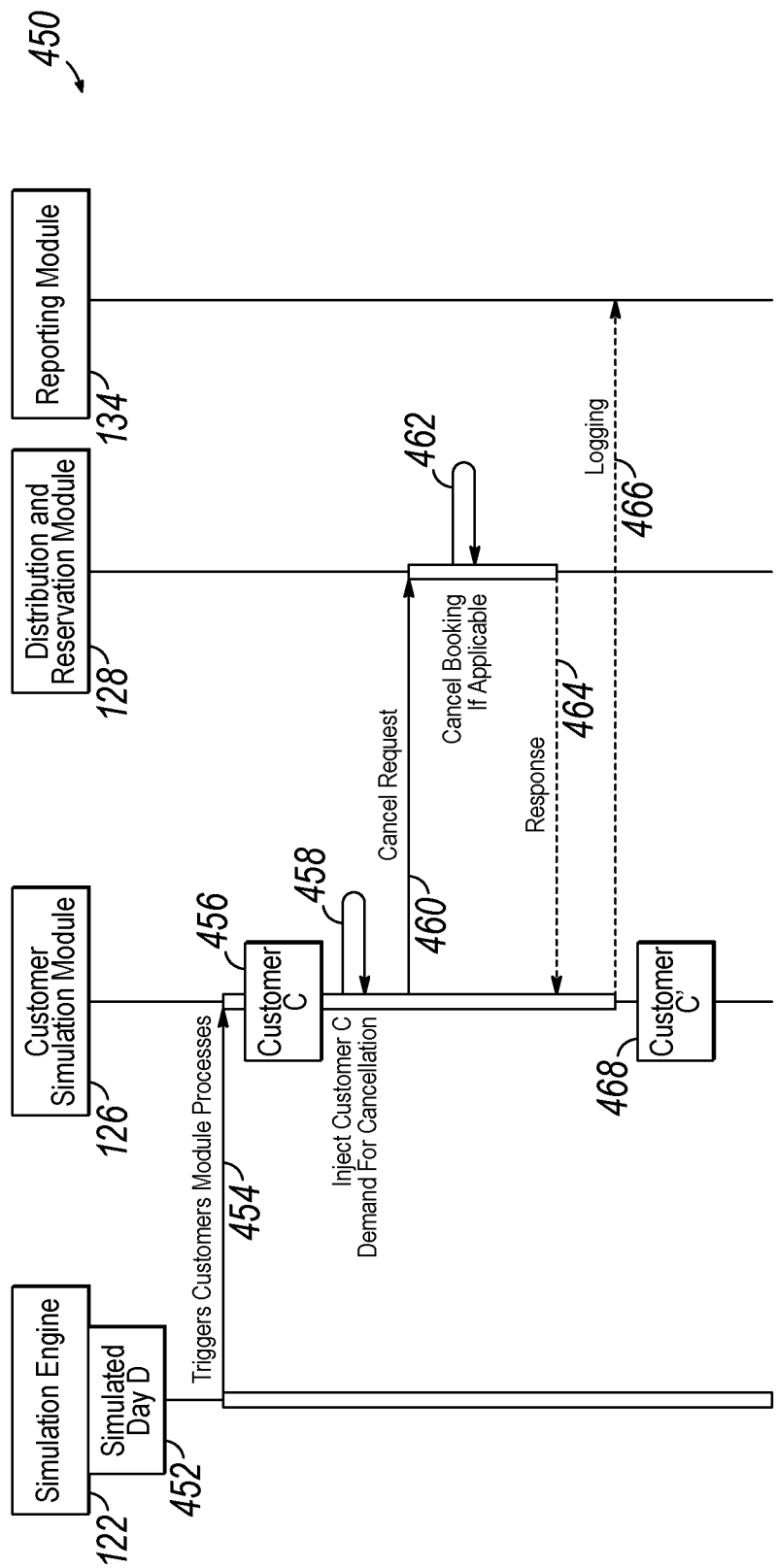
FIG. 7 is a sequence diagram illustrating a routine that may be performed by the data processing system of FIG. 1 to process a cancellation demand line during simulation consistent with some embodiments of the invention.

FIG. 7 provides an example routine 450 in the form of a sequence diagram that may be performed by the data processing system 100 to transform each cancel demand line of a simulated cancel request into a cancellation flow consistent with some embodiments of the invention. As shown, for a first simulation day (labeled 'Simulated Day D') 452, the simulation engine 122 triggers the customer simulation module 126 (block 454) for a first cancel demand line (labeled 'Customer C') 456 of a simulated cancellation request for the first simulation day 452 (block 454). The customer simulation module 126 injects a cancellation demand associated with the cancellation demand line of Customer C 456 into the booking flow (block 458). The customer simulation module 126 generates a cancel request based at least in part on the first cancel demand line, and the customer simulation module communicates the cancel request to the distribution and reservation module 128 (block 460). The distribution and reservation module 128 determines whether a booking was made that is associated with the cancel request, and if an associated booking was made, the booking is cancelled (block 462). The distribution and reservation module 128 generates a response based on the cancellation of the booking (if applicable), and the distribution and reservation module 128 communicates the response to the customer simulation module 126 (block 464). The customer simulation module 126 communicates simulation data based on the cancellation of the booking (if applicable) to the reporting module 134 for storage in the simulation results database 148. After processing the first cancel demand line (blocks 456-466), the customer simulation module 126 may process a second cancel demand line (labeled 'Customer C") 468 for the first simulation day 452.

Figure 8:
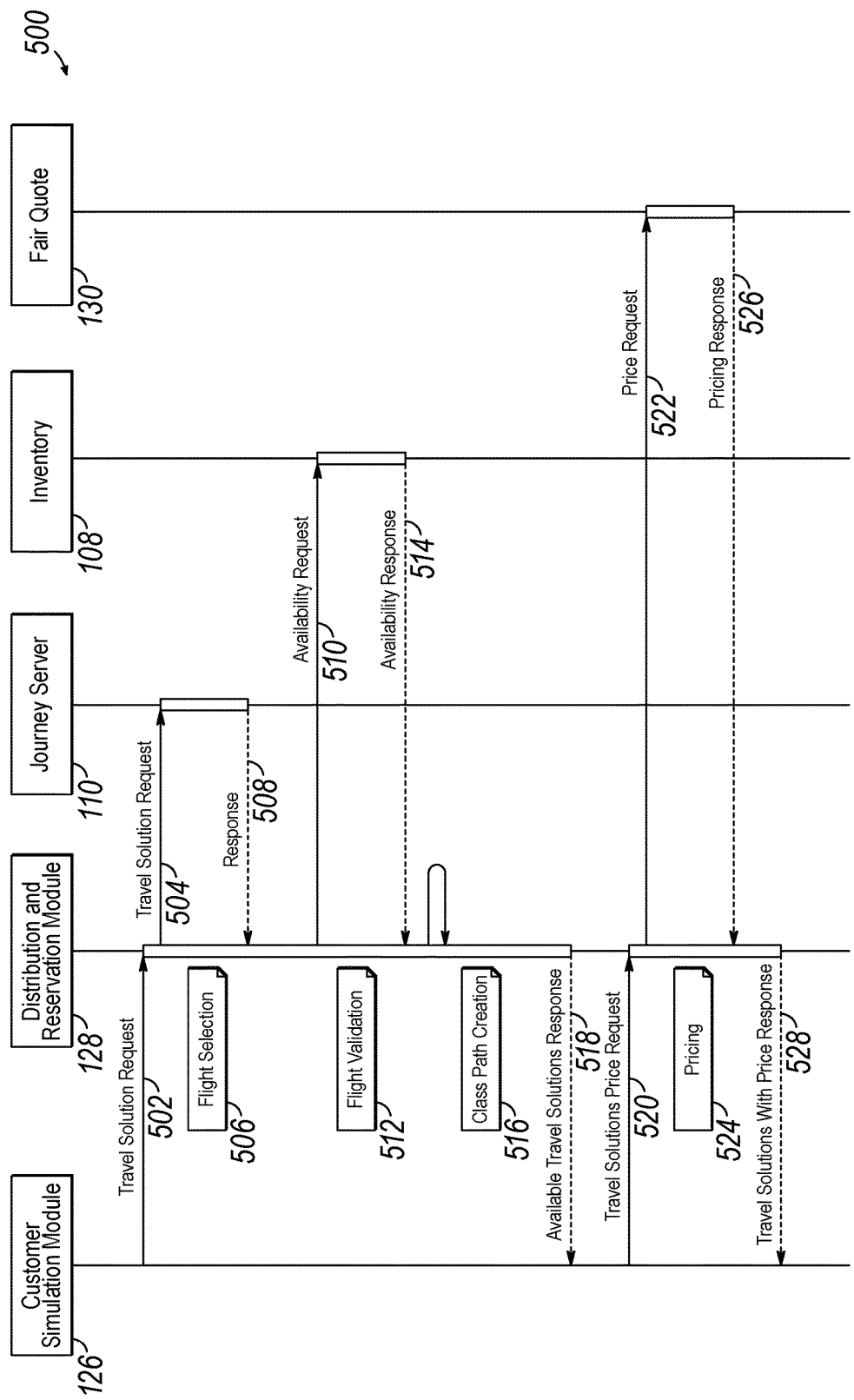
FIG. 8 is a sequence diagram illustrating a routine that may be performed by the data processing system and/or inventory system of FIG. 1 to simulate a booking and/or shopping flow consistent with some embodiments of the invention.

In general, the distribution and reservation module 128 is configured to perform operations generally associated with a reservation system and/or distribution system (such as a global distribution system). Therefore, the distribution and reservation module 128 may interface with the journey server 110, the inventory system 108, and/or a fare quote module 130. As will be appreciated, consistent with embodiments of the invention, the customer simulation module 126 may interface with the distribution and reservation module 128 to request available travel solutions, price travel solutions, book travel solutions, and/or cancel bookings during a simulation. FIG. 8 provides an example routine 500 in the form of a sequence diagram that may be performed by the data processing system 100 to determine and price travel solutions for a booking demand line. The customer simulation module 126 generates a travel solution request based at least in part on the booking demand line, and the customer simulation module communicates the travel solution request to the distribution and reservation module 128 (block 502). The distribution and reservation module 128 communicates the travel solution request to the journey server 110 (block 504). As discussed previously, the journey server 110 stores travel schedules and/or scheduling information for travel services offered by the travel merchant. The travel solution request may identify an origin and destination pair, travel dates, and/or other such information. The journey server may determine one or more combinations of one or more travel services (e.g., flights) that fulfill the travel solution request (block 506) based on the travel schedules, where such combinations of one or more travel services may be referred to as possible travel solutions. Therefore, the distribution and reservation module 128 receives, from the journey server 110 possible travel solutions that match the origin, the destination, and/or the travel dates of the travel solution request. In some embodiments, a filter may be applied such that only possible solutions with at least one travel segment operated and/or marketed by the travel merchant are retained as possible travel solutions. As will be appreciated, the journey server 110 comprises production data (i.e., actual travel schedules and scheduling information).

The journey server communicates the possible travel solutions in a response to the distribution and reservation module 128 (block 508). The distribution and reservation module 128 processes the possible travel solutions and generates an availability request for production travel inventory items associated with each possible travel solution. The availability requests are communicated to the inventory system 108 (block 510). The inventory system 108 determines an availability for each production travel inventory item of an availability request (e.g., flight validation) (block 512), and the inventory system communicates an availability response for each availability request that indicates an availability for each production travel inventory item of the availability request (block 514). The availability response is generated based on production travel inventory item availability at the inventory system 108. In some embodiments, each availability for a production travel inventory item may indicate an availability for each booking class of the production travel inventory item.

The distribution and reservation module 128 associates each travel inventory item of a possible travel solution to a best suitable booking class (e.g., class path creation), where a class path comprises a list of travel inventory items and a booking class for each (block 516). Based on the availability response received for each availability request, some possible travel solutions may be removed from consideration due to lack of availability. In some embodiments, the distribution and reservation module 128 may rank available travel solutions based at least in part on distance traveled in a best ranked cabin relative to a total distance of the associated journey (which may be referred to as a cabin ratio). The distribution and reservation module 128 may remove travel solutions having a cabin ratio lower than 80% of a travel solution having the highest cabin ratio. Based on the cabin ratio ranking and filtering and/or availability, the distribution and reservation module 128 communicates a response to the customer simulation module 126 (block 518) that indicates available travel solutions for the travel solution request.

The customer simulation module 126 may select one or more of the available travel solutions for pricing, and the customer simulation module 126 may communicate a pricing request that identifies the selected travel solutions to the distribution and reservation module (block 520). The price request is communicated to the fare quote module 130 (block 522), and the fare quote module 130 determines a price for each travel solution identified in the pricing request (block 524). The fare quote module 130 generates a pricing response for the price request that includes a priced travel solution corresponding to each travel solution identified in the pricing request (block 526). Consistent with some embodiments, generating the pricing response comprises calculating a fare for each travel inventory item of a travel solution and computing a potential revenue for the travel merchant. The distribution and reservation module 128 may discard any available travel solutions for which pricing information is not received. The priced travel solutions are communicated to the customer simulation module 126 (block 528) such that a booking decision may be performed.

Figure 9:
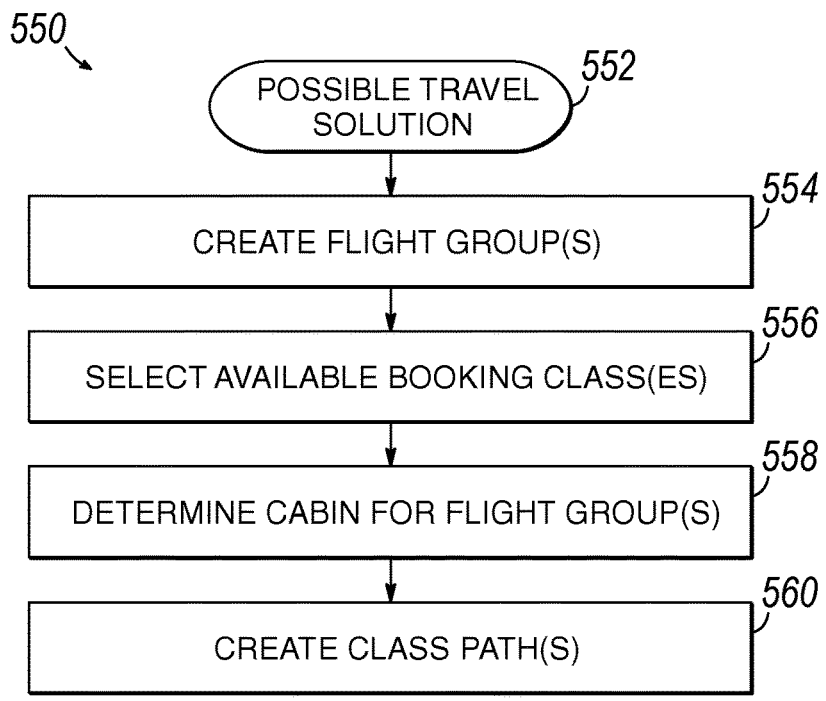
FIG. 9 is a flowchart illustrating a sequence of operations that may be performed by the data processing system of FIG. 1 to create class paths consistent with some embodiments of the invention.

FIG. 9 provides a flowchart 550 that illustrates a sequence of operations that may be performed by the data processing system 100 consistent with embodiments of the invention to create class paths for a possible travel solution 552. The distribution and reservation module 128 groups travel inventory items associated with contiguous travel services within a respective flight group (block 554), where the cabin and bookings are generally the same. If a different travel inventory item is not within the same cabin or booking class structure the travel inventory item is grouped in a different flight group. For example, travel inventory items for short distance flights may not be configured with first class offerings. A flight group generally comprises a number of contiguous travel segments (and the associated travel inventory items) that have the same travel merchant and the same existing cabins configuration. The distribution and reservation module 128 selects a common available booking class for all travel inventory items of travel segments of a flight group (block 556). The distribution and reservation module 128 discards cabins with no available booking classes, and the distribution and reservation module 128 determines a cabin for each flight group (block 558). In some embodiments of the invention, determining a cabin for a flight group having several possible cabins may comprise ranking each possible cabin based at least in part on a preferred cabin associated with a booking demand line. The distribution and reservation module 128 creates possible class paths for each flight group (block 560) by combining existing booking classes of each different production travel inventory item to get all possible class paths. FIGS. 10A-C provide tables 570-590 that provide example preferred cabin ranking scores that may be implemented. In FIG. 10A, if a preferred cabin is a first class cabin (labeled 'FIRST'), a rank assigned to the FIRST cabin may be 1; a rank assigned to a business class cabin (labeled 'BUSINESS') may be 2; and a rank assigned to an economy class cabin (labeled 'ECONOMY') may be 3. In FIG. 10B, if a preferred cabin is an economy class cabin (labeled 'ECONOMY'), a rank assigned to the ECONOMY cabin may be 1; a rank assigned to a business class cabin (labeled 'BUSINESS') may be 2; and a rank assigned to a first class cabin (labeled 'FIRST') may be 3. In FIG. 10C, if a preferred cabin is a business class cabin (labeled BUSINESS'), a rank assigned to the 'BUSINESS' cabin may be 1; a rank assigned to a first class cabin (labeled 'FIRST') may be 2; and a rank assigned to an economy class cabin (labeled 'ECONOMY') may be 3. In some embodiments of the invention, for a flight group having more than one cabin, ranking thereof may comprise selecting a cabin for each travel inventory item of the flight group having a highest ratio of preferred cabin for distance traveled relative to total distance traveled for an associated journey.

FIG. 11 provides an example routine 600 in the form of a sequence diagram that may be performed by the data processing system 100 to book one or more travel inventory items response to a positive booking decision. The customer simulation module 126 communicates a booking request to the distribution and reservation module 128 (block 602). The booking request indicates a priced travel solution that the customer simulation module 126 selected for booking responsive to the booking decision. The distribution and reservation module 128 communicates the booking request to the inventory system 108 (block 604), and the inventory system 108 communicates a booking response that indicates whether booking of the priced travel solution was successful (block 606). As will be appreciated, the inventory system 108 adjusts booking counters for the production travel inventory items of the booking request when processing the booking request. The distribution and reservation module 128 communicates the booking response to the customer simulation module 126 (block 608).

FIG. 12 provides an example routine 650 in the form of a sequence diagram that may be performed by the data processing system 100 to cancel a booking of one or more travel inventory items. The customer simulation module 126 generates a cancellation request for one or more bookings of travel inventory items based at least in part on a cancellation demand line, and the customer simulation module 126 communicates the cancellation request to the distribution and reservation module (block 652). The distribution and reservation module 128 communicates the cancellation request to the inventory system 108 (block 654). The inventory system 108 processes the cancellation request and communicates a cancellation response that indicates whether cancellation of the booking was successful (block 656), and the cancellation response is communicated from the distribution and reservation system 128 to the customer simulation module 126 (block 658). In general, the inventory system 108 adjusts booking counters for the production travel inventory items associated with the cancellation request when processing the cancellation request.

The departure control module 132 may be configured to simulate passenger cancellations, no-shows, and/or unticketed passenger demand. Consistent with embodiments of the invention, the departure control module 132 may compute and/or update departure control system counters during simulation. As a consequence, some counters, such as boarded passengers, denied-boarding passengers, and/or upgraded passengers for travel inventory items associated with travel services may be adjusted during the simulation. After demand booking lines and/or cancellation demand lines of a demand file of a given day are processed, simulated boarding figures may be synchronized with inventory counters maintained for the production inventory items of the inventory system 108.

Figure 13:
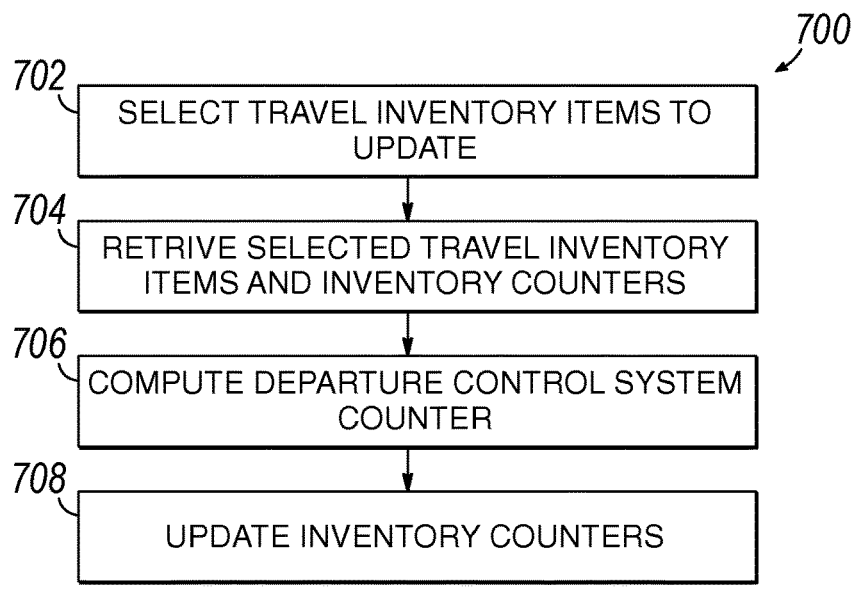
FIG. 13 is a flowchart illustrating a sequence of operations that may be performed by the data processing system of FIG. 1 to update inventory counters of an inventory system based on simulated departure control counters.

FIG. 13 provides a flowchart 700 that illustrates a sequence of operations that may be performed by the data processing system 100 consistent with embodiments of the invention to update inventory counters for a particular simulation day of a range of simulation days at an inventory system 108 based on simulated departure control. The departure control module 132 may select production travel inventory items for which inventory counters are to be updated (block 702). Generally, the departure control module 132 selects production travel inventory items for which a departure date corresponds to the particular simulation day. The departure control module 132 retrieves the selected production travel inventory items from the inventory system 108 such that the inventory counters associated with each production travel inventory item are retrieved (block 704).

The departure control module 132 computes a departure control system counter for each travel inventory item (block 706) that simulates passenger boarding, denial of boarding for a passenger, and/or upgrades. For each production travel inventory item, a departure control system counter is computed for each of one or more travel segments associated with the travel inventory item. For each travel segment, a cabin, a capacity of each cabin, and/or the sum of booking counters of the booking class belonging to a cabin are compared. If the sum of booking counters is lower than or equal to cabin capacity, a boarded passenger counter of a departure control system counter is set to correspond to the sum of the booking counters. If the sum of the booking counters is greater than the capacity, a boarded passenger counter of the departure control system counter is set to the capacity, and a denied passenger counter of the departure control system counter is set to a difference between the sum of bookings counters and the capacity. If some seats remain available in a greater cabin, the seats may be reallocated to the greater cabin. Reallocation of the seats to a greater cabin may impact a number of upgrades in to the greater cabin and the number of upgrades out of the lower cabin. In some embodiments, passengers booking in a highest class of a lower cabin may be upgraded to a lowest class of a higher cabin. After computing the departure control system counters, the departure control module 132 updates the inventory counters of the inventory system (block 708). In general, updating the inventory counters may include adjusting availability for classes and/or cabins based on upgrades, denials, and/or no-shows computed by the departure control module 132 as departure control system counters.

FIG. 14A provides a table 750 that illustrates an example computation of departure control system counters 752 that may be performed by the data processing system. In this example, a class level computation is shown for a boarded passenger counter (labeled 'Boarded') 754, a denied passenger counter (labeled 'Denied') 756, an upgrade-in counter (labeled 'Upgrade-In') 758, and an upgrade-out counter (labeled 'Upgrade-Out') 760. In the example, seven classes (labeled 'F', 'J', 'D', 'C', 'Y', 'H', and 'K') are provided. Based on inventory counters 762 (labeled 'Capacity' 764 and 'Bookings' 766), the departure control module 132 may compute the departure control system counters 752. As shown in the example, with regard to class F, the Booking counter 764 exceeds the Capacity counter 766, such that the corresponding Boarded 754 counter is set to capacity (in this example, 5), and the denied counter 756 is set to the difference between Bookings 766 and Capacity 764 (i.e., 6−5=1). In addition, with regard to class Y, because capacity was exceeded for classes Y, H, and K, two passengers from class Y were upgraded out of class Y and upgraded in to class C. In this example, the Upgrade-Out counter 760 for class Y and the Upgrade-In counter 758 for class C reflect the change.

FIG. 14B provides a table 800 that illustrates an example computation of departure control system counters 802 that may be performed by the data processing system. In this example, a cabin level computation is shown for a boarded passenger counter (labeled 'Boarded') 804, a denied passenger counter (labeled 'Denied') 806, an upgrade in counter (labeled 'Upgrade-In') 808, and an upgrade out counter (labeled 'Upgrade-Out') 810. In the example, three cabins (labeled 'F', 'J', and 'K') are provided. In this example, for cabin Y, the Bookings counter 816 exceeds Capacity 814 for the cabin. The departure control module 132 may compute that one passenger will be denied, which is shown in the denied passenger counter 806. Since, cabin J has excess capacity (i.e., the Bookings counter 816 is less than Capacity 814), the departure control module 132 may upgrade-out passengers from cabin Y and upgrade-in the passengers into cabin J to address capacity issues in cabin Y.

The reporting module 134 is generally configured to log simulation data generated during a simulation and after completion of a simulation, where the simulation data may be based at least in part on simulated demand requests, simulated cancel requests, availability requests, availability responses, pricing requests, pricing responses, departure control system counters computed during the simulation, inventory counters for production travel inventory items, and/or other such information. As will be appreciated, the reporting module 134 may store simulation data for each simulation day of a simulation period. Therefore, embodiments of the invention may store simulation day correlated inventory counters, departure control counters, and/or other such information such that management of the production inventory items by the inventory system 108 may be evaluated on a simulation day basis. Analysis of simulation data for different simulations may allow evaluation of different inventory system 108 and/or revenue management system 118 configurations. For example, first simulation data may be associated with a first simulation and second simulation data may be associated with a second simulation. The inventory system 108 and/or revenue management system 118 may be configured with a first configuration for the first simulation, and the inventory system 108 and/or revenue management system 118 may be configured with a second configuration for the second simulation. Comparison of the first simulation data and the second simulation data may therefore facilitate evaluation of the first configuration and the second configuration with regard to management of production travel inventory items.

Figure 15:
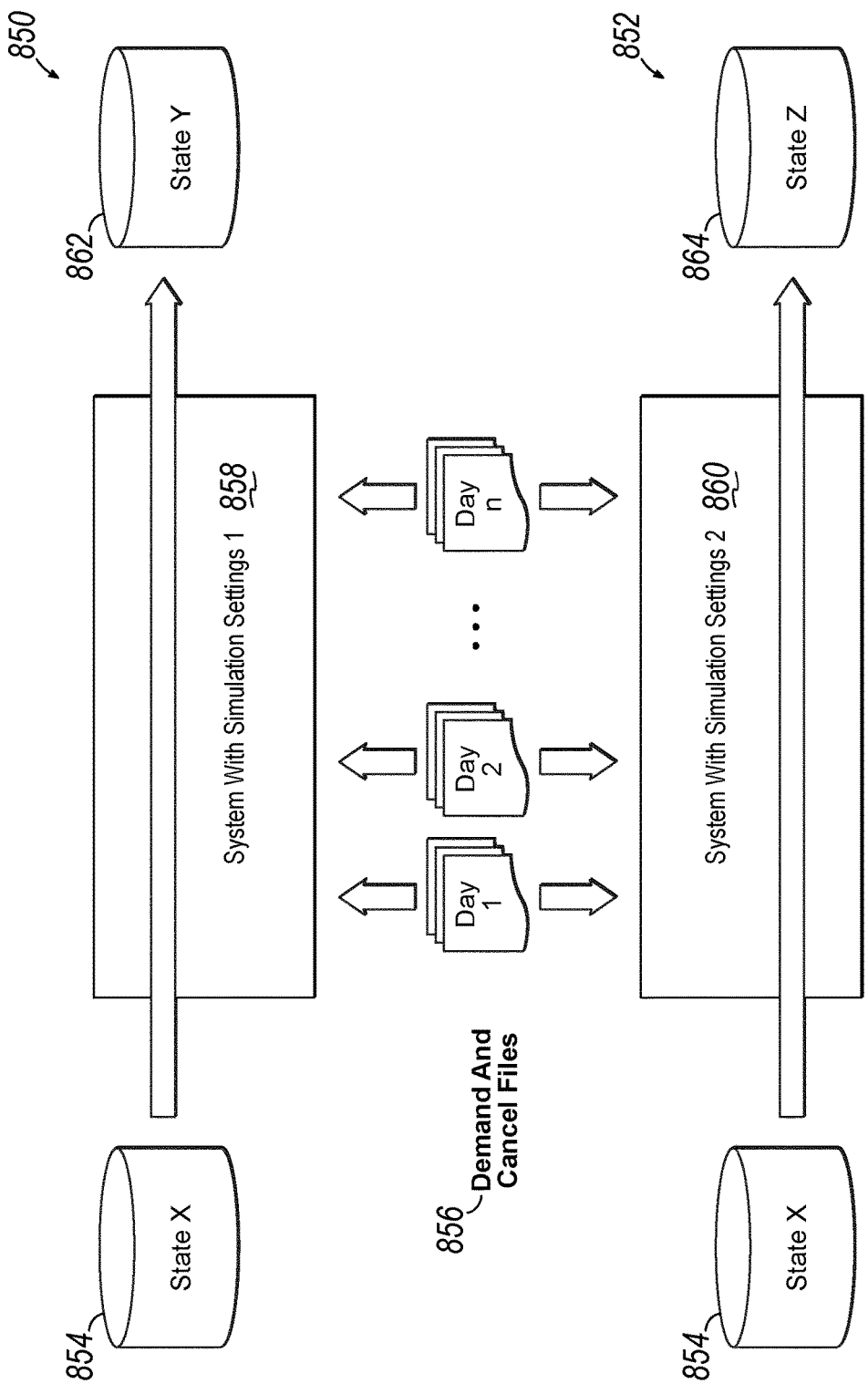
FIG. 15 is a block diagram that illustrates example inputs and outputs of different simulations performed by the data processing system of FIG. 1.

FIG. 15 provides a block diagram that illustrates a first simulation 850 and a second simulation 852. As shown, an initial state (labeled 'State X') 854 of an inventory system 108 and/or revenue management system 118 is the same in both simulations 850, 852. Furthermore, inputs (labeled 'Demand and Cancel Files') 856 for both simulations 850, 852 are the same. Notably, the inputs 856 correspond to simulated demand requests and simulated cancel requests for each simulation day of a range of simulation days. For the first simulation 850, the inventory system 108 and/or revenue management system 118 may be configured with a first configuration (labeled 'System with Simulation Settings 1') 858. For the second simulation 852, the inventory system 108 and/or revenue management system 118 may be configured with a second configuration (labeled 'System with Simulation Settings 2') 860. Due to the different configurations for the first simulation 850 and the second simulation 852, the simulation data generated and stored for each simulation 850, 852 may be different. As shown, for the first simulation 850, first simulation data (labeled 'State Y') 862 is generated and stored, and for the second simulation 852, second simulation data (labeled 'State Z') 864 is generated and stored. Therefore, as shown in the example, management of production travel inventory items by the inventory system 108 and/or pricing management by the revenue management system 118 may be evaluated consistent with embodiments of the invention. In particular, in some embodiments, an evaluation of different configurations of the inventory system and/or revenue management system may be generated.

Figure 16:
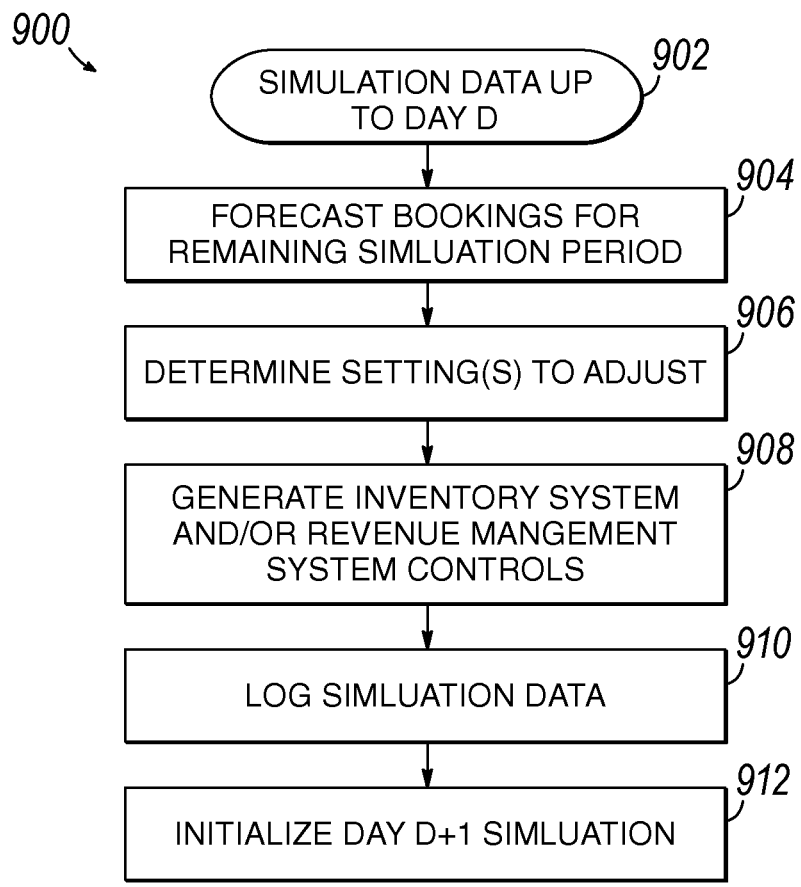
FIG. 16 is a flowchart that illustrates a sequence of operations that may be performed by the data processing system during execution of a simulation to adjust a configuration of the inventory system and/or revenue management system of FIG. 1.

FIG. 16 provides a flowchart 900 that illustrates a sequence of operations that may be performed by the data processing system 100 during execution of a simulation to adjust a configuration of an inventory system 108 and/or revenue management system 118. In some embodiments of the invention, during simulation, the data processing system 100 may analyze simulation data after simulating a particular day (i.e., Day D) 902 of the defined simulation period (i.e., the range of simulation days). The data processing system 100 may forecast bookings for a remainder of the simulation period based on the simulation data collected through the particular day of the simulation (block 904). Based at least in part on the forecasted bookings and the collected simulation data, the data processing system may determine one or more revenue management system settings and/or one or more inventory system settings (e.g., one or more rules for configuration) to adjust to thereby optimize revenues for the remainder of the simulation (block 906). The data processing system 100 may generate inventory and/or revenue management system controls that define the settings to be adjusted to thereby change the configuration of the inventory system 108 and/or revenue management system 118 (block 908), and the inventory and/or revenue management system controls may be communicated to the inventory system 108 and/or revenue management system 118. Adjustment of the one or more settings may be logged via the reporting module 134 (block 910). Following adjustment, the data processing system may initialize simulation of the next day (i.e., Day D+1) for the simulation period (block 912).

Therefore, as will be appreciated, embodiments of the invention simulate a booking flow for production travel inventory items managed by an inventory system. In particular, embodiments simulate a customer interaction with a reservation and/or distribution system. In turn, embodiments of the invention interface with a journey server, inventory system and/or a revenue management based on the simulated demand and simulated customer interaction. As will be appreciated, embodiments of the invention facilitate evaluation of production travel inventory management and pricing management for a travel merchant. Therefore, the data processing system is generally configured to transform simulated demand requests and/or simulated cancel requests into automated simulated booking, shopping, and/or cancellation flows. Inventory responses and pricing for the simulated booking, shopping, and/or cancellation flows may be stored as simulation data for evaluation thereof. Embodiments of the invention therefore address benchmarking and evaluation shortcomings in the highly computerized electronic travel management and reservation technology area. As will be appreciated, the transformation of simulated demand requests and/or simulated cancel requests into booking requests, cancellation requests, and/or pricing requests generally comprises dynamically generating database queries for an inventory system and/or journey server. Moreover, the transformation of simulated demand requests and/or simulated cancel requests into booking requests, cancellation requests, and/or pricing requests generally comprises dynamically performing simulated booking decisions that reflect simulated decision making processes. Therefore, embodiments of the invention address shortcomings in database systems and database system management. In particular, evaluation and analysis of database management configurations may be realized by embodiments of the invention.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for automatically evaluating and analyzing travel inventory database management configurations by an inventory system, the system comprising:
    at least one processor; and
    a memory coupled with the at least one processor, the memory comprising:
        a data structure stored thereon and configured to store simulation data for one or more simulations; and
        program code stored thereon and configured to be executed by the at least one processor to cause the at least one processor to:
            store one or more simulation rules, the one or more simulation rules including one or more configuration settings;
            receive simulated demand requests for a simulation period, wherein each simulated demand request includes one or more booking demand lines;
            generate one or more first availability requests based at least in part on the simulated demand requests, wherein the one or more first availability requests are associated with one or more inventory counters managed by the inventory system;
            receive a first availability response from the inventory system for each of the one or more first availability requests that indicates an availability associated with each of the one or more inventory counters;
            simulate, based at least in part on the one or more simulation rules and the availability associated with each inventory counter, a first booking decision associated with each inventory counter for a first portion of the simulation period by transforming each booking demand line of the simulated demand requests into each first booking decision, wherein transforming each booking demand line includes injecting a first booking demand associated with each booking demand line into a first booking flow that simulates customer interaction with one or more servers of a reservation system; and
            store first simulation data for the simulation period in the data structure based at least in part on the first availability requests, the first availability response for each first availability request, and the first booking decision associated with each inventory counter.

2. The system of claim 1, wherein the program code is further configured upon execution to cause the at least one processor to:

generate one or more travel solution requests based at least in part on the simulated demand requests; and
determine a travel solution response for each travel solution request that includes one or more available travel solutions for each travel solution request,
wherein the first booking decision associated with each inventory counter is simulated based at least in part on the available travel solutions.

3. The system of claim 2, wherein the one or more availability requests for the one or more inventory counters are generated based at least in part on the available travel solutions.

4. The system of claim 2, wherein the program code is further configured upon execution to cause the at least one processor to:
select one or more available travel solutions to be priced for each travel solution request; and
determining priced travel solutions for the selected available travel solutions,
wherein the first booking decision associated with each inventory counter is simulated based at least in part on the priced travel solutions.

5. The system of claim 4, wherein the program code is further configured upon execution to cause the at least one processor to:
select a particular priced travel solution for each travel solution request to be booked,
wherein the first booking decision associated with each inventory counter is simulated based at least in part on the particular priced travel solution selected for each travel solution request and a willingness-to-pay value of a particular booking demand line associated with the travel solution request.

6. The system of claim 5, wherein the first simulation data is based at least in part on the particular priced travel solution selected for each travel request.

7. The system of claim 4, wherein the one or more available travel solutions for each travel solution request are selected for pricing based at least in part on a travel cabin, a travel time, and a number of connections associated with each available travel solution.

8. The system of claim 2, wherein the program code is further configured upon execution to cause the at least one processor to:
determine a score for each available travel solution;
rank each available travel solution based at least in part on the score; and
select one or more available travel solutions to be priced based at least in part on the ranking of each available travel solution.

9. The system of claim 1, wherein the program code is further configured upon execution to cause the at least one processor to:
simulate cancellations by adjusting inventory counters based at least in part on simulated demand requests.

10. A method of analyzing travel inventory item management by an inventory system, the method comprising:
storing one or more simulation rules that include one or more configuration settings;
receiving simulated demand requests for a simulation period, wherein each simulated demand request includes one or more booking demand lines;
generating, with at least one processor, one or more first availability requests based at least in part on the simulated demand requests, wherein the one or more first availability requests are associated with one or more inventory counters managed by the inventory system;
receiving a first availability response from the inventory system for each of the one or more first availability requests that indicates an availability associated with each of the one or more inventory counters;
simulating, with the at least one processor based at least in part on the one or more simulation rules and the availability associated with each inventory counter, a first booking decision associated with each inventory counter for a first portion of the simulation period by transforming each booking demand line of the simulated demand request into each first booking decision, wherein transforming each booking demand line includes injecting a first booking demand associated with each booking demand line into a first booking flow that simulates customer interaction with one or more servers of a reservation system; and
storing, with the at least one processor, first simulation data for the simulation period based at least in part on the first availability requests, the first availability response for each first availability request, and the first booking decision associated with each inventory counter.

11. The method of claim 10, further comprising:
generating, with the at least one processor, one or more travel solution requests based at least in part on the simulated demand requests; and
determining, with the at least one processor, a travel solution response for each travel solution request that includes one or more available travel solutions for each travel solution request,
wherein the first booking decision associated with each inventory counter is simulated based at least in part on the available travel solutions.

12. The method of claim 11, wherein the one or more availability requests for the one or more inventory counters are generated based at least in part on the available travel solutions.

13. The method of claim 11, further comprising:
selecting, with the at least one processor, one or more available travel solutions to be priced for each travel solution request; and
determining priced travel solutions for the selected available travel solutions,
wherein the first booking decision associated with each inventory counter is simulated based at least in part on the priced travel solutions.

14. The method of claim 13, further comprising:
selecting, with the at least one processor, a particular priced travel solution for each travel solution request to be booked,
wherein the first booking decision associated with each inventory counter is simulated based at least in part on the particular priced travel solution selected for each travel solution request and a willingness-to-pay value of a particular booking demand line associated with the travel solution request.

15. The method of claim 14, wherein the first simulation data is based at least in part on the particular priced travel solution selected for each travel request.

16. The method of claim 13, wherein the one or more available travel solutions for each travel solution request are selected for pricing based at least in part on a travel cabin, a travel time, and a number of connections associated with each available travel solution.

17. The method of claim 11, further comprising:
determining, with the at least one processor, a score for each available travel solution;

ranking, with the at least one processor, each available travel solution based at least in part on the score; and selecting, with the at least one processor, one or more available travel solutions to be priced based at least in part on the ranking of each available travel solution.

18. The method of claim 10, further comprising:

simulating, with the at least one processor, cancellations by adjusting inventory counters based at least in part on simulated demand requests.

19. The method of claim 10, further comprising:

simulating, with the at least one processor, passenger boarding for travel service components associated with the one or more inventory counters for each day of the simulation period based at least in part on the first booking decision for each inventory counter;

reallocating seating for the travel service components based at least in part on the simulated passenger boarding; and adjusting the inventory counters based at least in part on the reallocated seating.

20. The method of claim 10, wherein the first availability responses, the first simulated booking decision associated with each inventory counter, and the first simulation data correspond to a first inventory system configuration, and further comprising:

generating one or more second availability requests for the one or more inventory counters;

receiving a second availability response from the inventory system for each of the one or more second availability requests that indicates a second availability for each of the one or more inventory counters, wherein the second availability response for each of the one or more second availability requests corresponds to a second inventory system configuration;

simulating, based at least in part on the second availability response for each of the one or more second availability requests, a second booking decision associated with each inventory counter for a second portion of the simulation period by transforming each booking demand line of the simulated demand requests into each second booking decision, wherein transforming each booking demand line includes injecting a second booking demand associated with each booking demand line into a second booking flow that simulates customer interaction with the one or more servers of the reservation system;

storing second simulation data for the simulation period based at least in part on the second availability requests, the second availability response for each of the one or more second availability requests, and the second simulated booking decision for each travel inventory item; and analyzing the first simulation data and the second simulation data to thereby analyze the first inventory systems configuration relative to the second inventory system configuration.

21. The method of claim 10, further comprising:

after simulation of a first day of the simulation period, analyzing the simulation data collected up to the first day of the simulation period to forecast bookings for the one or more inventory counters for a remaining portion of the simulation period;

determining at least one inventory system setting to adjust to thereby optimize revenue for the inventory system for the remaining portion of the simulation period based at least in part on the forecasted bookings;

generating an inventory system control that identifies the at least one inventory system setting to adjust and communicating the inventory system control to the inventory system; and after communicating the inventory system control, initializing simulation of a subsequent day of the simulation period.

22. A computer program product comprising:

a computer readable storage medium; and program code stored on the computer readable storage medium and configured, upon execution, to cause at least one processor to:

store one or more simulation rules that include one or more configuration settings;

receive simulated demand requests for a simulation period, wherein each simulated demand request includes one or more booking demand lines;

generate one or more first availability requests based at least in part on the simulated demand requests, wherein the one or more first availability requests are associated with one or more inventory counters managed by the inventory system;

receive a first availability response from the inventory system for each of the one or more first availability requests that indicates an availability associated with each of the one or more inventory counters;

simulate, based at least in part on the one or more simulation rules and the availability associated with each inventory counter, a first booking decision associated with each inventory counter for a first portion of the simulation period by transforming each booking demand line of the simulated demand request into each first booking decision, wherein transforming each booking demand line includes injecting a first booking demand associated with each booking demand line into a first booking flow that simulates customer interaction with one or more servers of a reservation system; and store first simulation data for the simulation period in the data structure based at least in part on the first availability requests, the first availability response for each first availability request, and the first booking decision associated with each inventory counter.

* * * * *